United States Patent
von Bagh et al.

(10) Patent No.: US 11,248,964 B2
(45) Date of Patent: Feb. 15, 2022

(54) STOVE GUARD UTILIZING DIFFERENT WAVELENGTHS

(71) Applicant: SAFERA OY, Espoo (FI)

(72) Inventors: Hans von Bagh, Porvoo (FI); Samuli Lintonen, Vantaa (FI)

(73) Assignee: SAFERA OY, Espoo (FI)

( * ) Notice: Subject to any disclaimer, the term of this patent is extended or adjusted under 35 U.S.C. 154(b) by 326 days.

(21) Appl. No.: 16/422,354

(22) Filed: May 24, 2019

(65) Prior Publication Data

US 2019/0360866 A1  Nov. 28, 2019

(30) Foreign Application Priority Data

May 25, 2018  (FI) .................................... 20185482

(51) Int. Cl.
*G01J 5/00* (2006.01)
*G01J 5/08* (2022.01)
*F24C 7/08* (2006.01)

(52) U.S. Cl.
CPC .............. *G01J 5/089* (2013.01); *F24C 7/082* (2013.01); *G01J 5/0846* (2013.01); *G01J 5/0896* (2013.01)

(58) Field of Classification Search
CPC .. G01J 5/00; G01J 5/089; G01J 5/0846; G01J 5/0896; F24C 7/082
See application file for complete search history.

(56) References Cited

U.S. PATENT DOCUMENTS

| | | | | |
|---|---|---|---|---|
| 3,415,994 A * | 12/1968 | Fitti, Jr. | ................ | G01J 5/0815 250/349 |
| 5,153,563 A | 10/1992 | Goto et al. | | |
| 6,299,920 B1 * | 10/2001 | Saksena | ................ | G01K 11/22 219/706 |
| 6,618,687 B2 * | 9/2003 | Warkander | ........... | G01K 11/003 374/E11.002 |
| 7,239,974 B2 * | 7/2007 | Gulati | ................... | G01J 5/0003 374/121 |
| 7,265,350 B2 * | 9/2007 | Fauci | ................... | A61B 5/0059 250/330 |

(Continued)

FOREIGN PATENT DOCUMENTS

DE 10 2004 023846 A1 12/2005
EP 1986 468 A1 10/2008

(Continued)

OTHER PUBLICATIONS

EP Search Report for Appln No. 19175617.0 dated Oct. 17, 2019 (9 pages).

(Continued)

*Primary Examiner* — Gail Kaplan Verbitsky
(74) *Attorney, Agent, or Firm* — Alston & Bird LLP (57) ABSTRACT

A stove guard comprises a data processing unit (101) and a temperature sensor arrangement (102) for receiving thermal radiation from objects in a specific field of view and for supplying detector signals representative of the received thermal radiation to the data processing unit (101). The temperature sensor arrangement (102) includes at least three detector elements (201, 202, 203), their sensitivity bands located at different positions along an optical radiation wavelength axis. The sensitivity band of one of said detector elements is limited to a wavelength range of less than 1.2 micrometers.

18 Claims, 3 Drawing Sheets

(56) References Cited

U.S. PATENT DOCUMENTS

| | | | | |
|---|---|---|---|---|
| 7,591,583 | B2* | 9/2009 | Foes | G01N 25/72 250/338.1 |
| 7,745,759 | B2* | 6/2010 | Long | A47J 31/20 219/214 |
| 7,771,113 | B2* | 8/2010 | Corbet | G01K 15/007 374/1 |
| 10,554,897 | B2* | 2/2020 | Mathur | G08B 17/125 |
| 10,810,860 | B1* | 10/2020 | Eubanks | G01J 5/026 |
| 2005/0194537 | A1* | 9/2005 | Fauci | A61B 5/0068 250/330 |
| 2005/0265423 | A1* | 12/2005 | Mahowald | H05B 6/687 374/121 |
| 2006/0192670 | A1* | 8/2006 | Tice | G08B 17/12 340/522 |
| 2006/0278897 | A1* | 12/2006 | Heller | G01J 1/0418 257/222 |
| 2007/0214967 | A1* | 9/2007 | Has | G01J 5/60 99/358 |
| 2009/0003405 | A1* | 1/2009 | Corbet | G01K 13/02 374/1 |
| 2013/0077157 | A1* | 3/2013 | Cook | G02B 13/04 359/357 |
| 2013/0340500 | A1* | 12/2013 | Miller | G01N 25/56 73/29.02 |
| 2014/0346359 | A1* | 11/2014 | Holliday | H04N 13/239 250/340 |
| 2015/0185767 | A1* | 7/2015 | S. | G06F 1/1605 361/679.26 |
| 2016/0314676 | A1 | 10/2016 | Hsieh | |
| 2018/0341818 | A1* | 11/2018 | Steffanson | G06K 9/00771 |
| 2019/0212060 | A1* | 7/2019 | Lintonen | G01J 5/0846 |
| 2020/0054905 | A1* | 2/2020 | Livchak | G08B 17/10 |
| 2020/0100332 | A1* | 3/2020 | Inoshita | H05B 6/6455 |
| 2020/0367692 | A1* | 11/2020 | Stipe | G08B 5/36 |
| 2021/0043059 | A1* | 2/2021 | Chen | H04W 52/0206 |

FOREIGN PATENT DOCUMENTS

| | | | |
|---|---|---|---|
| EP | 2 562 480 | A1 | 2/2013 |
| EP | 2 704 521 | A1 | 3/2014 |
| EP | 3 508 793 | A1 | 7/2019 |
| JP | 62126589 | A * | 11/1985 |
| JP | 2003 109736 | | 4/2003 |
| JP | 2008 232468 | | 10/2008 |
| JP | 2011010935 | A * | 1/2011 |
| WO | WO 86 00179 | A1 | 1/1986 |
| WO | WO 2010/000947 | A1 | 1/2010 |

OTHER PUBLICATIONS

Finnish Search Report for Application No. 20185482 dated Dec. 17, 2018, 2 pages.

* cited by examiner

STOVE GUARD UTILIZING DIFFERENT WAVELENGTHS

FIELD OF THE INVENTION

The invention relates to stove guards for improving the operational safety of a stove. Specifically, the invention relates to utilizing a spectrum of the radiation detected by the stove guard.

BACKGROUND OF THE INVENTION

A central feature in the operation of a stove guard is an infrared, i.e. thermal radiation sensor that has a specific field of view and that receives thermal radiation emitted by objects in the field of view. There may also be several sensors in one stove guard, such that the stove guard's total field of view is formed as a combination of the fields of view of the sensors. If the stove guard receives, from objects in the field of view, thermal radiation in an amount exceeding a specific, predetermined threshold value, its control electronics may generate an alarm, switch off the stove and/or execute other operations in an aim to gain control of the exceptional situation. The prior art related to stove guards has been disclosed for example in the international patent application under publication number WO 2010/000947 A2.

In practice, it has been noticed that it may be difficult for the control electronics to make unambiguously correct conclusions from a signal output by the infrared sensor. One of the biggest problems is high degree of variation between emissivities of different types of dishes and food substances. This may cause high degree of variation in the amount of detectable thermal radiation. The difference in emissivity for a steel dish and a cast iron dish may be manyfold. Other factors affecting the amount of detectable thermal radiation include distances of the objects from the sensor and possible blind spots, such as dishes placed partly behind other dishes. Therefore, the total amount of thermal radiation detected by the sensor may not be reliably used to calculate the temperature of food or a dish in the field of view. This may result for example in false alarms.

Even the normal use of a stove involves plenty of situations where the temperature of objects in the field of view of the sensor or sensors varies to a significant degree. The user may find it frustrating and even frightening if he or she feels that a safety device such as a stove guard functions improperly. For example, switching off of the stove in the middle of normal use is frustrating for a user. It may be frightening for the user if he or she feels that the safety mechanism operates in a way that is not understandable or that seems random: the user may doubt that the stove guard has a fault that might prevent it from operating correctly in real need.

Because the stove guard is a safety device, its operation should be as secure and reliable as possible.

SUMMARY OF THE INVENTION

The object of the invention is to disclose a stove guard that is able to reliably and safely detect exceptional and dangerous situations. Another object of the invention is to disclose a stove guard that, regarding its sensors and data processing capability, offers versatile functions. Another object of the invention is to disclose a stove guard that, although being versatile and reliable, is also affordable to manufacture.

The objects of the invention are achieved by using, in a temperature sensor arrangement of the stove guard, two or more detectors having sensitivity bands located in different ways along an optical radiation wavelength axis, the sensitivity bands of two of the detectors located such that by comparing the results output by these two detectors, it is possible to detect differing changes in thermal radiation at different wavelength ranges and thereby the temperature of an object in the field of view.

The stove guard according to the invention is characterized by features set forth in the characterizing part of the accompanying independent claim relating to the stove guard. Preferred embodiments and additional features of the invention are set forth in the dependent claims.

In this text a temperature sensor arrangement refers to the stove guard's element or elements directly related to receiving thermal radiation from objects in a specific field of view and to forming detector signals representative of the received thermal radiation. The temperature sensor arrangement may generally include one or more actual detector elements, and the thermal radiation directed to them may be controlled and modified by various optical elements and filters. If the detector elements and/or their optics are optimized to different wavelength ranges, it will be possible to draw more comprehensive and reliable conclusions based on the signals they output than by just using them to detect a single wavelength band.

One alternative is to use two or more detector elements based on different technologies. Examples of such different technologies include thermopile sensors, InGaAs photodiodes, silicon photodiodes and germanium photodiodes. Another alternative that may be used in addition to or instead of different detector technologies involves different types of filters that restrict the spectrum of the received thermal radiation before it is caught by the actual detector element. In addition to infrared sensors, one or more visible light detector elements may be used.

The different detector elements do not necessarily have to have the same field of view. For example, an optic directing thermal radiation to a first detector element from a narrower part of the field of view than to a second detector element may be used. This arrangement provides the special advantage that the measurement signals output by different detector elements may be interpreted by taking into consideration their different fields of view. For example, if only one of the detector elements measures a very high temperature, there may be a single very hot point in the field of view, not evenly distributed heat sources over the whole area.

The advantages and application possibilities of the invention are disclosed more specifically in the detailed description of the embodiments and the accompanying figures.

DETAILED DESCRIPTION OF THE INVENTION

In this text the term "stove guard" is used to describe both a device and a functionality. The device aspect is best understood by considering the stove guard as an accessory that may be supplied separately and installed to supplement a kitchen consisting of other devices (stove, oven, extractor hood, light fixtures etc.). The term "functionality" may be used when the features described in this text as improving the operational safety of a stove and the necessary components are included as an integral part in one or more other kitchen devices.

Figure 1:
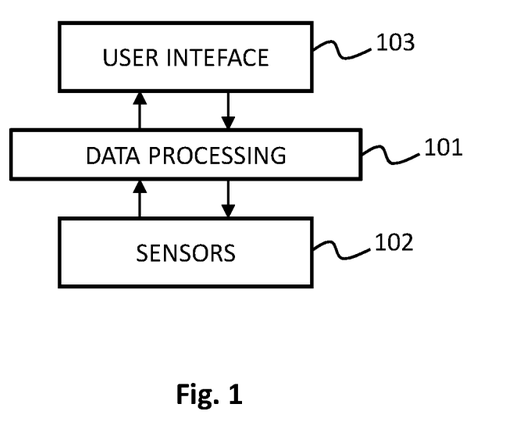
FIG. 1 illustrates a stove guard as a rough block diagram

FIG. 1 is a rough block diagram of a stove guard comprising a data processing unit 101 and a temperature sensor arrangement 102. The data processing unit 101 may be a single processor or microcontroller, or it may consist of a combination of several different processor circuits and additional components needed for their operation. A memory and other normal functions related to programmable devices are, in the block diagram of FIG. 1, arranged in the data processing unit 101 without illustrating them in any more detail. The purpose of the temperature sensor arrangement 102 is to receive thermal radiation from objects in a specific field of view and to supply detector signals representative of the received thermal radiation to the data processing unit 101.

The stove guard also comprises a user interface 103 that, in the block diagram illustrated in FIG. 1, includes all the elements via which the stove guard receives control commands from a user and gives the user information concerning its operations. A simple user interface may include just one or more buttons as well as one or more indicator lights and/or sound indicator devices. The user interface 103 may include for example light and/or sound indicator devices via which the data processing unit 101 may give an alarm for the user. A more versatile user interface may, for example, be provided with a screen that may be a touch screen, and/or speech recognition and speech synthesizing features. In the arrangement of FIG. 1, the user interface 103 is also considered to include all the elements that the stove guard uses to interact directly with other technical devices. These elements encompass for example controllable relays and corresponding devices via which the stove guard may automatically switch off the functions of the stove, if such devices are included in the arrangement.

The rough block diagram shown in FIG. 1 does not as such indicate in any way how physically separate units may make up the stove guard as a device, or in which other devices the functions described herein have been partly or fully integrated. One possibility is that the intelligence, computation and generation of internal commands for controlling the operations as represented by the data processing unit 101 are implemented in a current control unit located in a suitable place in the vicinity of the stove or elsewhere, but not necessarily so as to be easily accessible to the user. The temperature sensor arrangement 102 and the user interface 103 may in this case be located in one or two units that are physically separate from the current control unit and positioned according to their requirements (the temperature sensor arrangement 102 so that its field of view covers the central parts of the stove area; the user interface 103 so that it is easily accessible to the user), for example in a short-range wireless data connection with the current control unit.

The user interface 103 may also be fully or partly a part of the device that also includes the data processing unit 101 and the temperature sensor arrangement 102, or the user interface may be located in a completely separate device. The latter solution is applicable for example in installations where the temperature sensor arrangement 102 has to be located in a place that would be difficult for the user to see and/or reach during normal use. In this case the user interface 103 may be located in an easier place and the necessary data exchange connections between it and the rest of the device may be implemented for example with wires or a short-range wireless connection, for example a Bluetooth or Zigbee connection or the like. Yet another embodiment is one which, in addition to or instead of a user interface located in the actual stove guard device, involves the use of a wireless connection with the user's terminal device such as a smartphone or a tablet, the user interface being in this case implemented as a programmed process executed by the terminal device.

If the stove guard is considered as a functionality, it is possible to implement one or more of the blocks illustrated in FIG. 1 by using applicable elements of another kitchen device. For example the data processing unit 101 may be fully or partly included in data processing elements that also control other functions of the stove, oven, extractor hood, light fixture or other device. As another example, it is possible to fully or partly include the user interface 102 in a user interface of such other device.

It is typical of all electrically-powered devices that their operating voltage must be supplied from somewhere and transformed to a form suitable for the device components. Because these functions may, in the embodiments of the present invention, be implemented in any way and no inventiveness is related to them, it is not necessary to describe them in any more detail herein.

Figure 2:
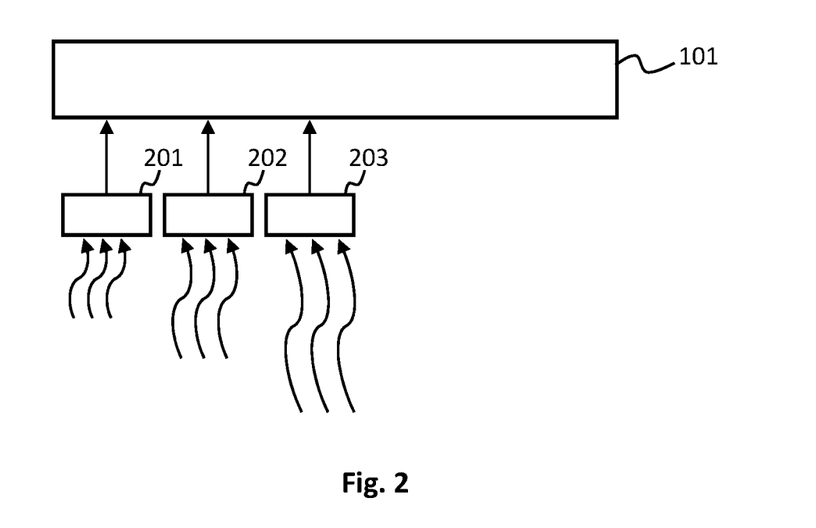
FIG. 2 illustrates the principle of a stove guard distinguishing different wavelengths

If the detector or detectors of the temperature sensor system have a wide bandwidth, they mainly detect the total amount of the received thermal radiation, not so much the shape of its spectrum, i.e. relative distribution of radiant energy at different wavelengths. FIG. 2 illustrates the principle of a stove guard comprising a temperature sensor system including two or more detector elements 201, 202 and 203 having sensitivity bands located at different positions along a thermal radiation wavelength axis.

With reference to the sensitivity band of the detector element, it should be noted that the sensitivity of the detector does not normally change sharply as a function of the wavelength of radiation, such that, in a literal sense, the sensitivity band does not "begin" at any precisely indicated wavelength value or "end" at one. According to established terminology in the art, the sensitivity band usually refers to a wavelength range at which the detector element is the most useful. One way of defining the limits of the sensitivity band is to use so-called FWHM values (Full Width at Half Maximum), meaning those wavelength values on both sides of the maximum sensitivity at which the sensitivity is half of the maximum. Another way of defining the limits of the sensitivity band is to use some other percentage of the maximum sensitivity, the corresponding wavelength being considered to be the limit of the sensitivity band. Detector element manufacturers typically indicate the sensitivity band of their detector elements as a curve representing external quantum efficiency or the IPCE ratio (Incident Photon to Converted Electron ratio) as percent of the theoretical maximum. Knowing the capacity of other electronics utilizing the signals output by the detector element, it is possible to read from the curve, in a manner that is obvious as such, what wavelength range radiation provides relevant values as measured by this detector element, i.e. what is the utilizable sensitivity band of this detector element.

One way to locate the sensitivity bands of different detector elements at different positions along the thermal radiation wavelength axis is to use detector elements based on different detector technologies. The longest-wave detector element 203 may be for example a thermopile sensor provided with a suitable filter and having a sensitivity band of about 3-16 micrometers or part of it. The detector element 202 for medium waves may be for example an InGaAs photodiode provided with a suitable lens and having a sensitivity band of about 1-4 micrometers or part of it. The shortest-wave detector element 201 may be for example a silicon or germanium photodiode having a sensitivity band of about 700-1000 nanometers or part of it, for example 800-900 nanometers.

Another alternative, by way of example, for the longest- and medium-wave detector elements is to use a first thermopile sensor provided with a filter and having a sensitivity band of 6-16 micrometers or part of it, and a second thermopile sensor provided with a filter and having a sensitivity band of 3-6 micrometers or part of it.

It should be noted that although FIG. 2 specifically illustrates three detector elements, the stove guard implemented this way may comprise only two detector elements or four or more detector elements. The stove guard may also comprise other optical detector elements, such as a photodiode operating in the visible light range (400-700 nanometers) or part of it. If the stove guard comprises only two detector elements, their sensitivity bands are preferably located such that they both extend to a wavelength range of over 1.2 micrometers, or such that one is limited to a wavelength range of less than 1.2 micrometers and the other extends to a wavelength range of over 1.2 micrometers but limited to less than 6 micrometers.

The sensitivity bands of different detector elements may be located at completely different positions along the optical radiation wavelength axis, as in the example described above (for infrared sensors 3-16 micrometers, 1-4 micrometers and 700-1000 or 800-900 nanometers; for the visible light sensor 400-700 nanometers). Another alternative is that the sensitivity bands of at least two detector elements overlie one another at least partly along the optical radiation wavelength axis. They may overlie one another for example in the area of the limit wavelength between them (for example 2-16 micrometers and 1-3 micrometers) or one of them may cover a narrower part of another one's sensitivity band (for example 3-16 micrometers and 6-10 micrometers). There may also be gaps between the sensitivity bands of different detector elements along the wavelength axis, i.e. the sensitivity bands of the detector elements do not necessarily have to cover a continuous length of the wavelength axis altogether.

In the stove guard of FIG. 2 the data processing unit 101 may be programmed to compare the detector signals output by the different detector elements 201, 202 and 203 to determine the temperature of an object in the field of view, and other information on the object. The data processing unit 101 may, for example, detect the absolute magnitude and rate of change of the detector signal output by each detector element. If there is a small object having a quickly rising temperature in the field of view, the detector signal output by the shortest-wave detector element 201 may be assumed to change faster than the detector signals output by the other detector elements 202 and 203.

Figure 3:
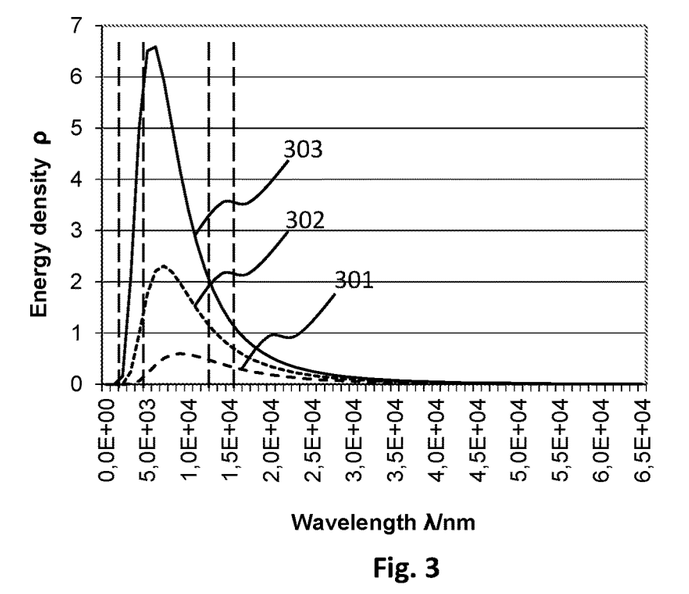
FIG. 3 illustrates thermal radiation emitted by a heating object at different temperatures

One essential advantage in using several wavelength ranges is related to estimating the actual temperature of dishes and food, regardless of differences in other factors, which include emissivity of the surfaces, size and distances of the objects, and shadow areas. For example a cast iron pan is, in terms of its radiation properties, close to the black body of Planck's law. According to Planck's law, as the temperature of a body rises, the peak of its emission spectrum moves continuously to a shorter wavelength. As a theoretical concept, the black body refers to a body that absorbs all incident radiation without reflecting anything, such that the spectrum of radiation it emits depends only on its own temperature. Planck's law is illustrated in FIG. 3, showing the calculated emitted energy density of one black body at different wavelengths when the temperature of the body is 50 degrees Celsius (curve 301), 150 degrees Celsius (curve 302) and 250 degrees Celsius (curve 303). The relative amount of radiation of different wavelength bands changes as the temperature increases, such that in general, increase is more rapid at a shorter wavelength band than at longer wavelength bands.

Figure 4:
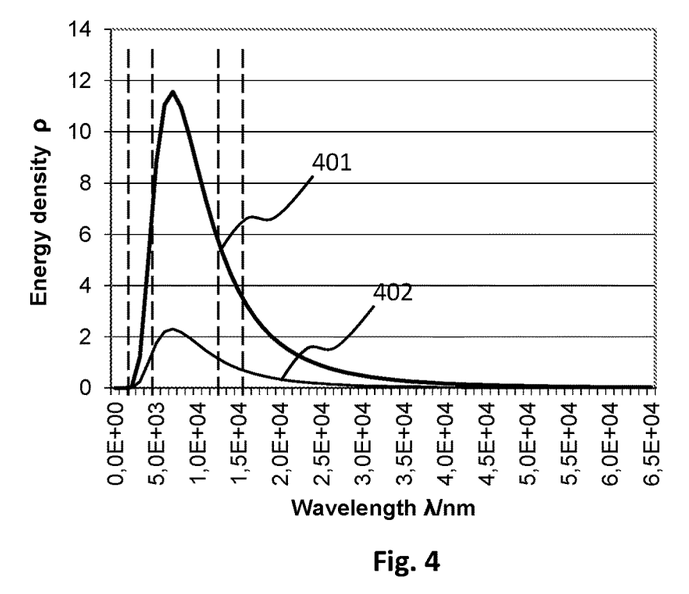
FIG. 4 illustrates thermal radiation emitted by two objects having different emissivities but the same temperature and FIG. 5 illustrates a stove guard provided with various sensors.

The amount of detectable infrared radiation is, however, also determined to a significant degree by emissivity of the surface of the body in the infrared range. For example, the emissivity of stainless steel is markedly lower than that of cast iron. Further, the emissivity of different materials may be in different ways wavelength-dependent. FIG. 4 illustrates a simplified situation where two bodies at 150 degrees Celsius behave as such according to Planck's law, but one of them has much higher emissivity in the whole infrared range (curve 401) than the other one (curve 402). However, the curve maxima are at the same position of the wavelength axis.

In FIGS. 3 and 4 the vertical dashed lines indicate, by way of example, some wavelength range limits of 2, 5, 13 and 16 micrometers. Two different example situations will be discussed. In the first example situation, in the field of view of the temperature sensor arrangement of the stove guard there is a body having a temperature rising from 50 degrees Celsius to 250 degrees Celsius, such that the spectrum of infrared radiation it emits changes from that according to curve 301 to that according to curve 303. In the second example situation, in the field of view of the temperature sensor arrangement of the stove guard there is initially one body at 150 degrees having a low emissivity (cf. curve 402), but another body at 150 degrees having a high emissivity (cf. curve 401) is placed in front of it.

A stove guard according to the prior art could comprise one wide-band infrared sensor measuring some wavelength band, for example the whole wavelength band from 3 to 16 micrometers. In both of the example situations as described above it would detect sharp increase in infrared radiation. In the first example situation the sensor would first measure the amount of radiation between curve 301 and the x-axis in the wavelength range limited by the outermost vertical dashed lines, and then the amount of radiation between curve 303 and the x-axis in the same wavelength range. In the second example situation it would first measure the amount of radiation between curve 402 and the x-axis, and then the amount of radiation between curve 401 and the x-axis in the above-mentioned wavelength range.

The stove guard according to the prior art would detect an increase in the measured amount of radiation, regardless of the wavelength range it would measure. However, its data processing unit would have a difficult task to conclude whether the increase in the measured amount of radiation is due to a rise of temperature or some other factor, such as a change in emissivity or distances of the objects in the field of view, or a change in shadow areas. Most importantly, it would be difficult for the stove guard according to the prior art to conclude, even based on the increased amount of radiation, what the real temperature of the object is. For example, a stainless steel pot always radiates relatively little, whereas a cast iron pan always radiates relatively much. Thus the total amount, or even the rate of increase, of infrared radiation received by the stove guard does not as such reliably indicate the temperature of the object, if no other information is provided about the object.

With reference to FIGS. 3 and 4, the stove guard according to one embodiment of the present invention comprising a temperature sensor arrangement including two detector elements may be considered by way of example. The sensitivity band of the first one of the detector elements is in this example located in the range of 2-5 micrometers, and the sensitivity band of the second one is located in the range of 13-16 micrometers along the wavelength axis. In the first example situation described above the first detector element would first measure the quite small amount of radiation between curve 301 and the x-axis in the wavelength range limited by the two leftmost vertical dashed lines. Correspondingly, the second detector element would first measure the amount of radiation between curve 301 and the x-axis in the wavelength range limited by the two rightmost vertical dashed lines. After the body would have heated up to 250 degrees, the first detector element would measure the much higher amount of radiation between curve 303 and the x-axis between the leftmost vertical dashed lines. Also the amount of radiation measured by the second detector element between curve 303 and the x-axis between the rightmost vertical dashed lines would have increased, but to a relatively much smaller extent.

In the second example situation the relative change between the initial and final situation in the amount of radiation measured by the first and the second detector elements of the stove guard according to the embodiment of the invention is the same, because in both bands between the vertical dashed lines (2-5 micrometers and 13-16 micrometers), curve 401 is scaled to curve 402 by the same factor. Therefore, the stove guard according to the embodiment of the invention could easily distinguish this situation from the first example situation and conclude that the detected change in the amount of infrared radiation is this time not due to a change in temperature, but to a fact that the emissivity of the surfaces in the field of view or their distance from the detector has changed, the visible portion of the surfaces has increased, new dishes have been placed in the field of view and/or new hotplates have heated to the same temperature as the former ones.

By comparing different wavelength bands relative to each another and their relative rates of change, it is possible to identify the point in time when an object in the field of view of the temperature sensor arrangement exceeds a specific absolute temperature, despite any side issues interfering with calculation, such as size, emissivity, distance or shading of the object. In the stove guard, this critical temperature is normally ca. 240-280 degrees Celsius. Reaching of the critical temperature is a suitable time for a switch-off alarm, so that self-ignition of fat and extremely strong smoking may be prevented. If the temperature sensor arrangement includes two detector elements, both having a sensitivity band extending to a wavelength range of over 1.2 micrometers (however, the sensitivity bands being different from one another), the comparison as described above may be performed for the suitable wavelength ranges in terms of the temperatures of interest.

Unwanted radiation that is non-related to the intended operation of the stove guard such as sunlight and intense light from certain artificial light sources may interfere with the measurement results in the shorter and medium wavelength ranges of the temperature sensor arrangement. To solve this problem, information of the shortest wavelength range or ranges may be used to cancel this interference in the medium wavelength range. For example, a sensor for a wavelength range of 800-900 nanometers or a sensor for the visible light range (400-700 nanometers) may be used to detect radiation changes originating from sunlight, artificial light or other sources non-related to the temperature changes in the stove area. In practice, the correction may be made for example by detecting the forms of the changes in the signals and by cancelling, from the medium range sensor signal, the changes having the same form as detected in the short range signals. In one alternative, the shortest wavelength range may be only intended for correcting the medium range, such that the shortest range signal is subtracted from the medium range signal, multiplied by a suitable, possibly automatically adaptable factor.

To implement the above-described correction it is advantageous to select, for the short wavelength detector element, a wavelength range that is close to visible light, i.e. less than 1.2 micrometers. It is advantageously located right adjacent to, or so as to slightly overlap the sensitivity band of the medium wavelength detector element. For the medium wavelength range detector elements the lower limit of the sensitivity band is in practice about one micrometer or, at the lowest, 0.9 micrometers.

Figure 5:
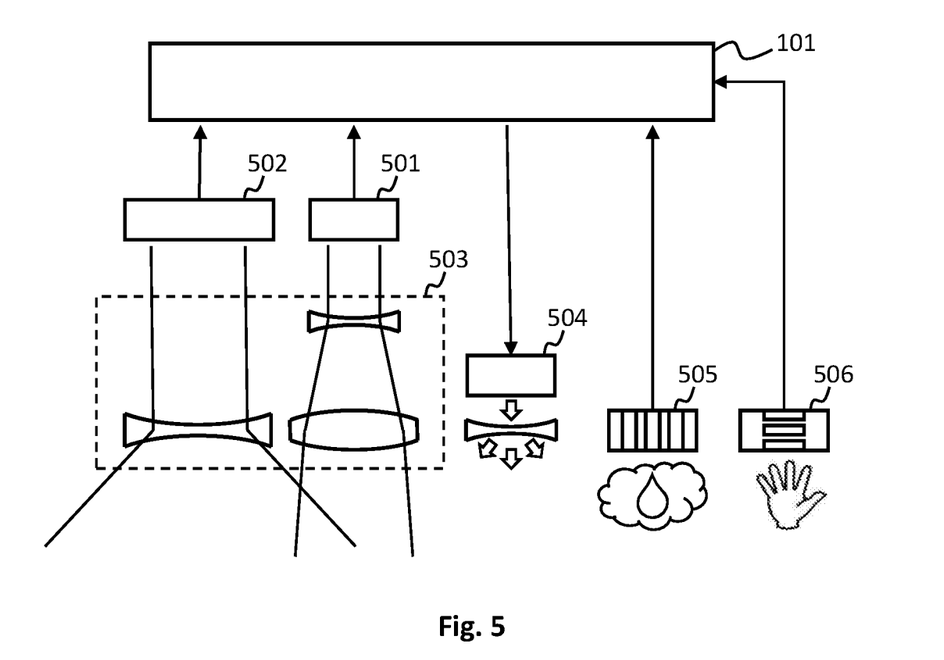

FIG. 5 schematically presents the sensor and data processing elements of one stove guard. The stove guard comprises a data processing unit 101 and its temperature sensor arrangement includes a first detector element 501 and a second detector element 502. It also includes an optic generally indicated in FIG. 5 by reference numeral 503, the optic being arranged to direct, to the first detector element 501, thermal radiation of a different wavelength range than to the second detector element 502. This type of optic may be used as an addition or an alternative to the configuration where the detector elements 501 and 502 are based on different detector technologies. As a technique, filtering of thermal radiation such that its spectrum is restricted is known as such, and it is therefore not necessary to discuss herein in any more detail what kinds of filters the optic 503 may possibly contain.

In FIG. 5 the optic 503 is further arranged to direct, to the first detector element 501, thermal radiation from a narrower part of the field of view than to the second detector element 502. In the example embodiment of FIG. 5, thermal radiation is directed to the first detector element 501 via a relatively directional lens arrangement and to the second detector element 502 via a wider lens arrangement, such that the field of view of the first detector element 501 forms a relatively narrow beam. It may be preferably located in the mid-area of the total field of view of the temperature sensor arrangement as a whole, but it is also possible to implement an arrangement where the field of view of the narrow-beam detector element is directed some other way. With a suitable and properly defined screen it would further be possible to conceal, from the field of view of the second detector element 502, the portion covered by the field of view of the first detector element 501. In this case the fields of view of the detector elements would abut but not overlap one another.

If the detector elements for different wavelength ranges are intended to directly cancel each other's signals, it is advantageous to arrange the optic and possible limiters such that their beams and sensitivity ranges are as similar as possible.

The conventional detector elements used for detecting thermal radiation are based on detecting the total amount of thermal radiation of a specific frequency, i.e. wavelength range (for example wavelengths of 4-16 micrometers) at a specific solid angle. If merely the detector signal output by the second detector element 502 was taken into consideration, it could be possible that one very hot object, such as a mistakenly switched-on hotplate, would provide a similar detector signal as a number of only reasonably hot objects over a wider area. In other words, the stove guard would not necessarily be able to reliably distinguish a dangerous situation (one overheated hotplate) from a normal situation (food being cooked on several hotplates).

In the stove guard illustrated in FIG. 5 the data processing unit 101 may be programmed to compare the detector signals output by the first detector element 501 and the second detector element 502 to determine whether the temperature measured by the first detector element 501 is different from that measured by the second detector element 502. If there is a marked difference between the temperatures measured by the detector elements 501 and 502, and further the temperature of the object as measured by either one of the detector elements is higher than a predetermined threshold value, it is likely that there is, in the field of view, a hot object so small that it only falls within the field of view of either one of the detector elements. The data processing unit 101 may be programmed to generate an alarm in response to this type of finding. As discussed above, the data processing unit 101 may additionally or alternatively be programmed to generate an alarm in response to detecting that the amount of the received thermal radiation as measured by the first detector element 501 has changed in a markedly different proportion to that measured by the second detector element 502.

Merely comparing the temperature of a measured object to a threshold value is often an insufficient method to reliably recognize exceptional and dangerous situations. It is described herein as a simplified example of a condition that must be satisfied in order for the data processing unit 101 to generate an alarm. In practice, the data processing unit 101 is generally programmed to execute algorithms, even complex ones, taking into consideration not only the momentary value of the detector signals but also the recent variation history and/or longer trends of the values and/or prior situations that resulted in alarms and the user's reactions to such situations. In the present invention it is not important as such what kind of reasoning algorithm the data processing unit 101 is programmed to execute, but the more essential feature is that, by means of a suitable temperature sensor arrangement, detector signals that have not been available in stove guards of the prior art can be produced for use by these algorithms.

Other elements illustrated as an example regarding the sensors and components of the stove guard of FIG. 5 include an optical transmitter 504, a humidity sensor 505 and a proximity sensor 506.

The features of the stove guard as described above may be modified and combined with each other in many different ways. For example, FIG. 5 suggests that all detector types would be used in the same stove guard. However, depending on the purpose and intended functionality, it is possible to choose only some of the detector types illustrated in FIG. 5 for the stove guard, and/or also to provide the stove guard with detector types not discussed in this description.

The stove guard or at least its temperature sensor arrangement (and/or other sensor arrangement) may be an integrated part of an extractor hood, a stove, an oven or other home appliance. The elements of the stove guard that would be integrated into a specific home appliance such as extractor hood may be built to the same size and shape as a light module that would be used in that home appliance to illuminate the stove and/or its vicinity. This arrangement provides a lighting-technical advantage, because all other elements used by the home appliance manufacturer in the assembly stage may the same, irrespective of whether an integrated stove guard or a regular light module is installed in the home appliance in question. The integratable stove guard may be installed in place already in connection with assembly or it may be inserted to replace a previously installed light module at a later time. The integratable stove guard may itself also include light sources, so the fact of whether there is only a light module or an integrated stove guard in a specific part of the home appliance does not affect the lighting of the stove and its vicinity.

The invention claimed is:

1. A stove guard device comprising:
a data processing unit; and
a temperature sensor arrangement for receiving thermal radiation from objects in a specific field of view and for supplying detector signals representative of the received thermal radiation to the data processing unit, wherein:
the temperature sensor arrangement includes at least three detector elements, their sensitivity bands located at different positions along an optical radiation wavelength axis,
the sensitivity band of one of said detector elements is limited to a wavelength range of less than 1.2 micrometers, and
the data processing unit is configured to identify the point in time when an object in the field of view of the temperature sensor arrangement exceeds a specific absolute temperature by comparing received thermal radiation on those of the sensitivity bands that correspond to different wavelength bands relative to each other above 1.2 micrometers and their relative rates of change.

2. The stove guard according to claim 1, comprising a short wavelength detector element and a medium wavelength detector element, their sensitivity bands located such that
the sensitivity band of the short wavelength detector element is less than 1.2 micrometers, and
the sensitivity band of the medium wavelength detector element is adjacent to or overlaps the sensitivity band of the short wavelength detector element.

3. The stove guard according to claim 1, wherein said data processing unit is programmed to compare the detector signals output by different detector elements to determine the temperature of an object in the field of view.

4. The stove guard according to claim 1, wherein at least two of its detector elements are based on different detector technologies.

5. The stove guard according to claim 4, wherein the detector technologies include at least two of the following: a thermopile sensor, an InGaAs photodiode, a silicon photodiode, a germanium photodiode.

6. The stove guard according to claim 4, wherein the detector technologies include at least:
a thermopile sensor having a sensitivity band of 3-16 micrometers or part of it and
an InGaAs photodiode having a sensitivity band of 0.9-4 micrometers or part of it.

7. The stove guard according to claim 4, wherein the detector technologies include at least:
a first thermopile sensor provided with a filter and having a sensitivity band of 6-16 micrometers or part of it and a second thermopile sensor provided with a filter and having a sensitivity band of 3-6 micrometers or part of it.

8. The stove guard according to claim 6, wherein the detector technologies further include:
a silicon photodiode having a sensitivity band of 800-900 nanometers or part of it.

9. The stove guard according to claim 6, wherein the detector technologies further include:
a visible light photodiode having a sensitivity band of 400-700 nanometers or part of it.

10. The stove guard according to claim 1, wherein:
the stove guard comprises an optic arranged to direct, to a first detector element, optical radiation of a different wavelength range than to a second detector element.

11. The stove guard according to claim 1, wherein said data processing unit is programmed to generate an alarm in response to detecting that the temperature of an object as measured by the first detector element is markedly different from that measured by the second detector element and the temperature of the object as measured by either one of the detector elements is higher than a predetermined threshold value.

12. The stove guard according to claim 1, wherein said data processing unit is programmed to generate an alarm in response to detecting that the amount of the received thermal radiation as measured by the first detector element has changed in a markedly different proportion to that measured by the second detector element.

13. The stove guard according to claim 1, wherein:
the stove guard comprises a proximity sensor arranged to measure the proximity of an external object and to supply object information corresponding to the measured proximity of the external object to said data processing unit
said data processing unit is programmed to identify whether a change in radiation received from an object in the field of view takes place simultaneously with the measured proximity of the external object, and
said data processing unit is programmed to generate an alarm in response to detecting that the change in radiation received from the object in the field of view does not take place simultaneously with the measured proximity of the external object.

14. The stove guard according to claim 2, wherein the sensitivity band of the short wavelength detector element is 800-900 nanometers.

15. The stove guard according to claim 2, wherein the sensitivity band of the short wavelength detector element is 400-700 nanometers.

16. The stove guard according to claim 2, wherein the sensitivity band of the medium wavelength detector element extends, at the shortest, to no shorter than 0.9 micrometers.

17. The stove guard according to claim 16, wherein the sensitivity band of the short wavelength detector element is 800-900 nanometers.

18. The stove guard according to claim 16, wherein the sensitivity band of the short wavelength detector element is 400-700 nanometers.

* * * * *